United States Patent [19]
Colclasure

[11] 3,881,691
[45] May 6, 1975

[54] ROLL UNDER JACK FOR ELEVATING A FRAME

[76] Inventor: Eugene D. Colclasure, 519 Campbell, Ardmore, Okla. 73401

[22] Filed: Nov. 7, 1973

[21] Appl. No.: 413,433

[52] U.S. Cl. .................................. 254/94; 254/127
[51] Int. Cl. ................................................. B66f 7/22
[58] Field of Search ............. 254/4 R, 86 R, 47, 48, 254/49, 94, 127; 280/150 A, 150 P

[56] References Cited
UNITED STATES PATENTS

| | | | |
|---|---|---|---|
| 1,081,013 | 12/1913 | Bunn | 254/86 R |
| 1,153,223 | 9/1915 | Hendrickson | 254/86 R |
| 1,460,229 | 6/1923 | Deal | 254/94 |

FOREIGN PATENTS OR APPLICATIONS

| | | | |
|---|---|---|---|
| 910,584 | 3/1954 | Germany | 254/86 R |

Primary Examiner—Al Lawrence Smith
Assistant Examiner—Robert C. Watson
Attorney, Agent, or Firm—Dunlap & Codding

[57] ABSTRACT

The present invention contemplates a roll under jack for elevating a frame of a boat trailer, for example, including a jack body having a wheel connected to one end thereof, the upper end of the jack body being removably connectable to a portion of the frame and the jack body being pullable in a jacking direction beneath the frame. A stop limits the movement of the jack body in a jacking direction and positions the jack body in a predetermined jacking position beneath the frame elevating the frame a distance above the ground generally corresponding to the height of the jack.

6 Claims, 6 Drawing Figures

PATENTED MAY 6 1975 3,881,691

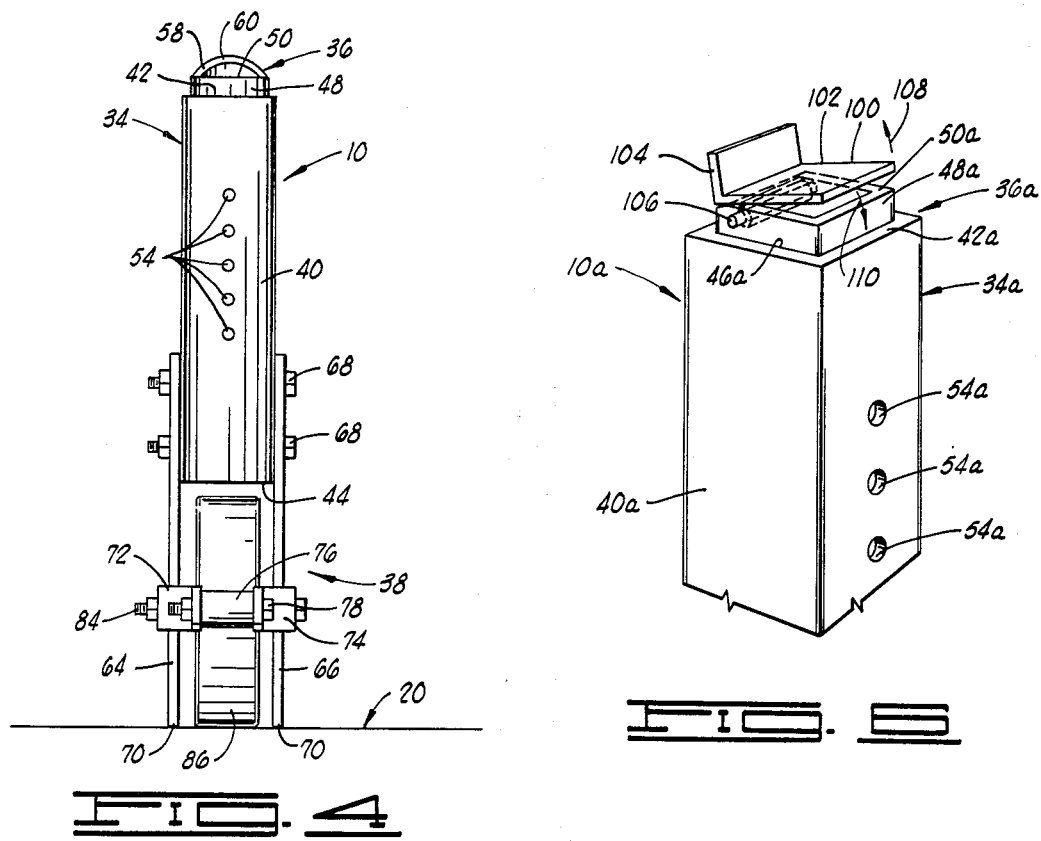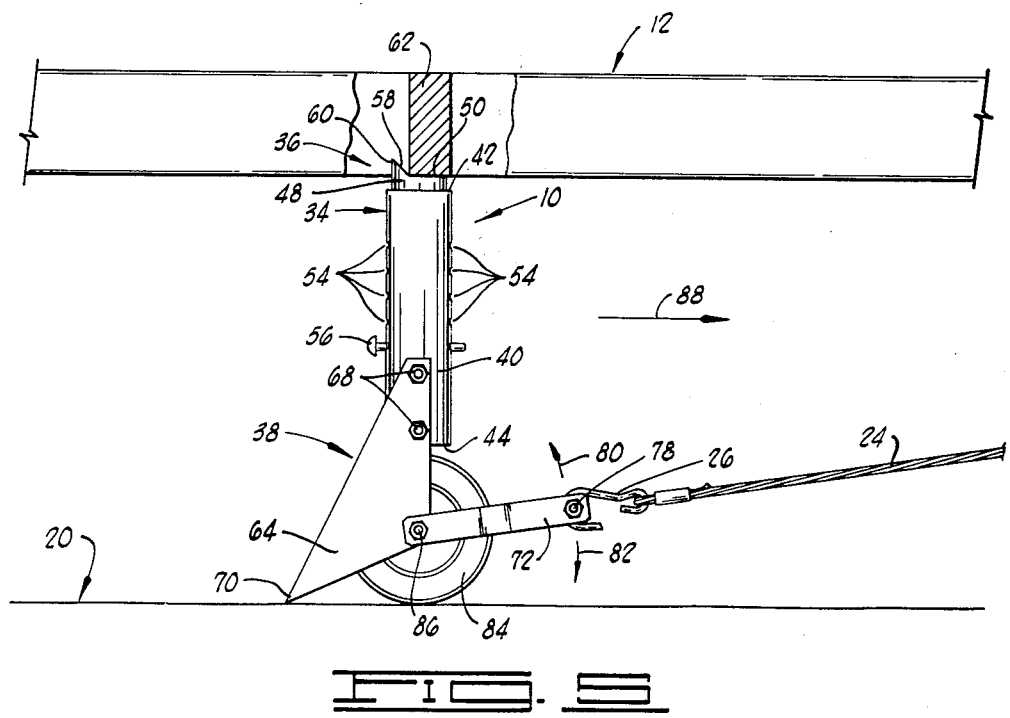

ROLL UNDER JACK FOR ELEVATING A FRAME

BACKGROUND OF THE INVENTION

1. Field of the Invention

This invention relates generally to jacks for elevating frames or the like and, more particularly, but not by way of limitation, to a removable jack for rolling into a jacking position beneath a frame to be elevated.

2. Description of the Prior Art

In the past various devices have been constructed for jacking or elevating frames such as automobiles and trailers and the like, for example. The U.S. Pat., No. 3,170,708, disclosed a jack for elevating a boat trailer which had a wheel secured to one end thereof, the jack remaining in a substantially vertical position during the operation thereof.

The U.S. Pat., No. 3,086,752, disclosed a boat trailer jack comprising a rod having a wheel connected on one end and the opposite end connectable to a trailer winch. The frame of the jack was initially slid onto a portion of the trailer frame and rolled to a position near the trailer winch. The winch was then connected to a portion of the jack and turned lifting the jack base and trailer frame to an elevated frame.

Various outer jack constructions were disclosed in the U.S. Pats. No. 2,829,906, issued to Hull; No. 3,022,043, issued to Weiss; and No. 3,322,392, issued to Hoffman.

SUMMARY OF THE INVENTION

An object of the invention is to provide a jack for elevating frames such as boat trailers or the like in a more efficient and more convenient manner.

Another ojbect of the invention is to provide a jack for elevating frames such as boat trailers or the like which utilizes existing power sources for the elevating power.

One other object of the invention is to provide a jack for elevating frames such as boat trailers or the like which is constructed and operates in a more efficient and more economical manner.

Other objects and advantages of the invention will be evident from the following detailed description when read in conjunction with the accompanying drawings which illustrate preferred embodiments of the invention.

BRIEF DESCRIPTION OF THE DRAWINGS

FIG. 4 is a front elevational view of the jack.

FIG. 5 is an enlarged, side elevtional view showing the jack in a jacking position beneath the boat trailer of FIG. 1, only a fragmentary portion of the boat trailer being shown in FIG. 5.

FIG. 6 is a fragmentary view of a portion of a modified jack constructed in accordance with the present invention.

DESCRIPTION OF THE PREFERRED EMBODIMENTS

Figure 1:
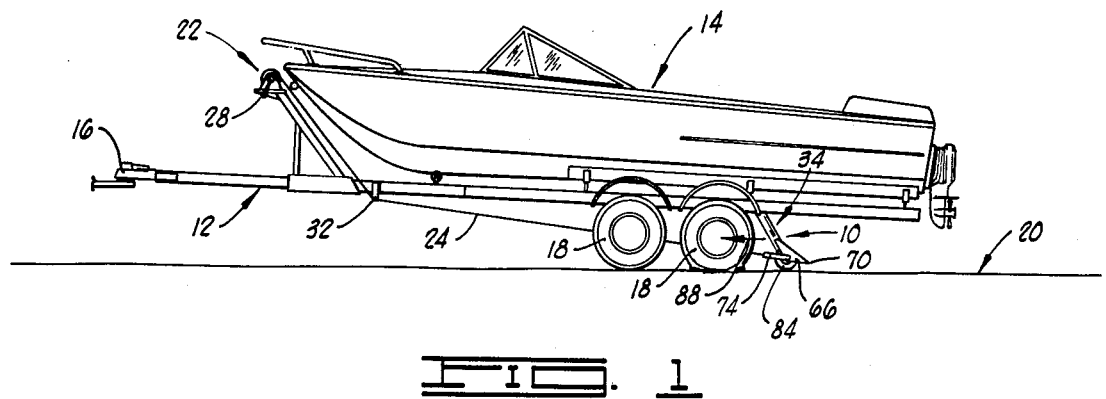
FIG. 1 is a side elevational view showing a boat mounted on a boat trailer and a jack constructed in accordance with the present invention positioned under the boat trailer frame.
Figure 2:
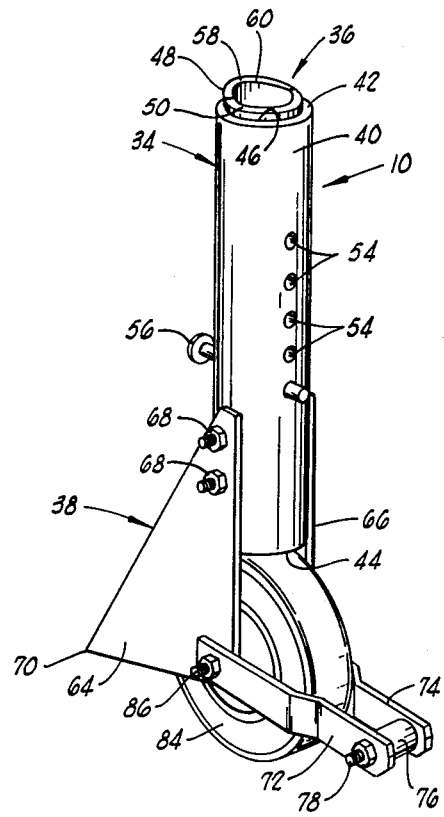
FIG. 2 is an enlarged, partial perspective view of the jack of FIG. 1.

Referring to the drawings in general and to FIGS. 1 and 2 in particular, shown therein and designated via the general reference numeral 10 is a jack constructed in accordance with the present invention and positioned beneath a frame 12 or, more particularly, a boat trailer frame, the boat 14 being shown positioned on the frame 12 for the purpose of illustrating one operational embodiment or use for the jack 10. The boat trailer frame 12 is constructed in a manner well-known in the art and includes a front end portion 16 connectable to a vehicle such as an automobile or the like (not shown) and ground engaging wheels 18 rotatingly connected to a rear end portion of the trailer frame 12 rollingly supporting the trailer frame 12 in an operational position thereof connected to a vehicle for transporting the boat 14 in the usual manner. The jack 10 is constructed for elevating the frame 12 to a position above the ground (designated in the drawings via the reference 20 for the purpose of reference) utilizing a power source generally included on existing trailers constructed for hauling or transporting boats such as the boat trailer frame 12, in a manner to be described in greater detail below.

A winch 22 is rotatingly connected to a portion of the frame 12, the winch 22 including a cable 24 having one end connected to the winch 22 and a hook 26 connected to the opposite end of the cable 24 (the hook 26 being shown more clearly in FIG. 5). The winch 22 is constructed in the usual manner for retrieving the cable 24 and releasing the cable 24, a handle 28 being connected to the winch 22 for rotating the winch 22 retrieving the cable 24 in one rotated direction and releasing the cable 24 in the opposite rotated direction of the handle 28. In some boat trailer constructions, the boat overhangs the boat trailer frame such that the boat interferes with the cable 24 during the operation of the jack 10 and, in those instances, it has been found useful to include a roller supported in a bracket 32 connected to the boat trailer frame 12, the cable 24 extending from the winch 22 through an opening (not shown) in the bracket 32 and to the jack 10. It should be particularly noted that most boat trailer frames 12 include a winch and cable assembly for pulling the boat onto the trailer and locking the boat in a secure transport position, the jack 10 being particularly constructed to use this existing power source as will be made more apparent below.

The jack 10, as shown more clearly in FIGS. 2, 3, 4 and 5, includes a jack body 34 having an upper end 36 and a lower end 38, the upper end 36 being shaped and constructed for engaging a portion of the frame 12. The jack body 34, more particularly, includes base 40 having an upper end 42 and a lower end 44, the lower end 38 of the jack body 34 being partially formed via the lower end 44 of the base 40. An opening 46 extends through a portion of the base 40 intersecting the upper end 42 thereof. The jack body 34 also includes a member 48 having an upper end 50 and a lower end 52, the lower end 52 being telescopingly disposed through the opening 46 in the base 40 and the upper end 50 forming the upper end 36 of the jack body 34. As shown in FIGS. 1 through 5, the base 40 and the member 48 are each cylindrically shaped, although each could be square shaped, for example, depending upon the application and the economics of construction.

Figure 3:
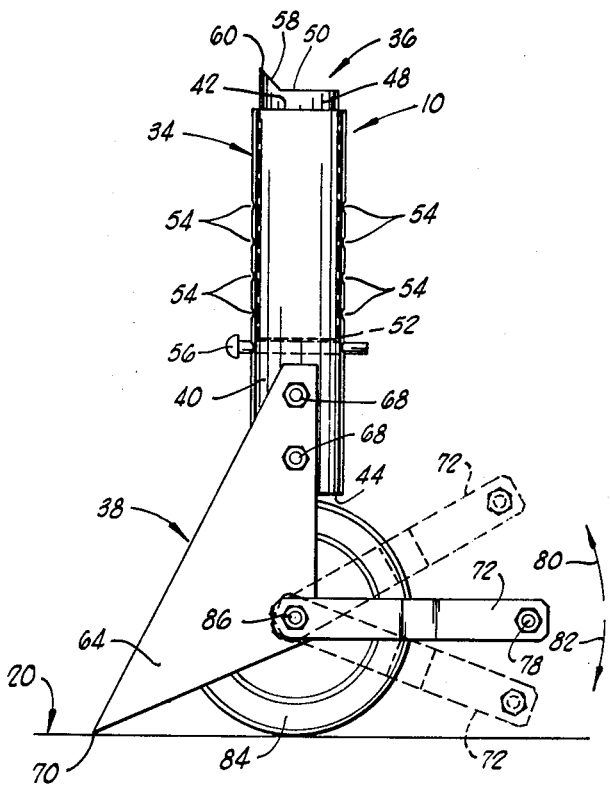
FIG. 3 is a side elevation view of the jack.

As shown more clearly in FIGS. 2, 3 and 4, a plurality of openings 54 are formed through the base 40, each opening 54 intersecting the opening 46 and the openings 54 being spaced generally between the upper end 42 and the lower end 44. The openings 54 intersect each side of the base 40 and, more particularly, form a plurality of pairs of spaced openings 54. A pin 56 is disposed through one of the pairs of openings 54, the pin 56 extending through the opening 46. In an assembled position, the pin 56 engages a portion of the base 40 near the openings 54 and a portion of the lower end 52 of the member 48 limiting the telescoping movement of the member 48 through the opening 46 in a direction toward the lower end 44 of the base 40 thereby positioning the member 48 in a predetermined position within the opening 46. The height of the jack body 34 between the upper and the lower ends 36 and 38 thereof is thus adjustable via positioning the pin 56 through different openings 54 thereby adjusting the height or distance above the ground the frame 12 will be elevated by the jack 10 during the operation (this particular adjustable feature of the jack 10 also being useful in utilizing the jack 10 with different frame constructions which may require various jack heights).

An angle portion 58 is formed in the upper end 50 of the member 48 forming an upwardly extending flange 60 on the upper end 50. The flange 60 is engageable with a portion of the frame 12 and, in one preferred form, is positioned in engagement with a cross-member on the frame 12 such as the cross-member 62 shown in FIG. 5, for example. The angle portion 58 and the flange 60 formed thereby cooperate to maintain engagement between the upper end 36 of the jack body 34 and the frame 12 as the jack 10 is pulled to a jacking position beneath the frame 12.

A pair of stop flanges 64 and 66 are secured to the lower end 44 of the base 40, each stop flange 64 and 66 being secured to one side of the base 40 via fasteners 68 and the stop flanges 64 and 66 being spaced a distance apart, as shown in FIG. 5. In one form, the stop flanges 64 and 66 form a portion of the jack body 34 and, in a preferred form, each of the stop flanges 64 and 66 are similarly constructed. Each stop flange 64 and 66 includes a ground engaging portion 70 extending a predetermined distance from the jack body 34 or, more particularly, the base 40 engaging the ground and limiting the movement of the jack body 34 in a jacking direction beneath the frame 12 and positioning the jack 10 in a predetermined jacking position, for reasons and in a manner to be made more apparent below.

One end of a pull bar 72 is pivotally secured to the lower end portion of the jack body 34, the pull bar 72 being more particularly pivotally secured to the stop flange 64. One end of a pull bar 74 is also pivotally secured to the lower end portion of the jack body 34, the pull bar 74 being more particularly pivotally secured to the stop flange 66. Each of the pull bars 72 and 74 extend a distance from the jack body 34 and a rod 76 is secured to the end of each pull bar 72 and 74, opposite the ends pivotally connected to the stop flanges 64 and 66, via a fastener 78. The pull bars 72 are pivotable in pivot directions 80 and 82 providing an adjustable connection for the cable 24.

As mentioned before, the stop flanges 64 and 66 are spaced a distance apart and a ground engaging wheel 84 is disposed between the stop flanges 64 and 66, the wheel 84 being rollingly secured to the lower end 38 of the jack body 34 via an axle 86 secured between the stop flanges 64 and 66. In a preferred form, the ends of the pull bars 72 and 74 secured to the stop flanges 64 and 66 are, more particularly, pivotally secured to the ends of the axle 86 extending through the stop flanges 64 and 66. The height of the jack 10 is more particularly defined via the distance between the upper end 50 of the member 48 and the wheel 84, the jack 10 being rollingly supported via the wheel 84.

During the operation of the jack 10 to elevate the frame 12 a distance above the ground 20, the jack 10 is initially positioned at an incline with a portion of the frame 12 such as the cross-member 62 portion disposed generally within the angle portion 58 of the member 48, the flange 60 engaging the cross-member 62 and the wheel 84 engaging the ground 20. In this initial or starting position, the ground engaging portions 70 of the stop flanges 64 and 66 are each positioned a distance above the ground 20, as shown in FIG. 1. Further, in this position, the hook 26 on the end of the cable 24 is secured about the rod 76 between the pull bars 72 and 74 and the handle 26 of the winch 22 is rotated in a direction tending to retrieve the cable 24 maintaining the cable 24 taut between the jack 10 and the winch 22.

After the jack 10 has been positioned beneath the trailer frame 12 in the starting position, the handle 28 is further rotated in a direction retrieving the cable 24 and pulling the jack 10 in a jacking direction 88. As the jack 10 is pulled in the jacking direction 88, the jack 10 is rollingly moved beneath the trailer frame 12 generally toward a vertically extending position of the jack 10, the upper end 36 of the jack body 34 remaining engaged with the cross-member 62 and the wheel 84 rollingly supporting the jack 10 as the jack 10 is pulled in the jacking direction 88 via the winch 22 and cable 24. Thus, the power of the winch 22 is utilized to pull the jack 10 to a jacking position beneath the trailer frame 12 which is particularly useful in those applications where the trailer frame is already equipped with a winch and cable assembly.

As the jack 10 is pulled in the jacking direction 88, the jack 10 is moved toward a vertically extending position beneath the frame 12 thereby elevating the frame 12 a distance above the ground 20. The ground engaging portions 70 are positioned to engage the ground 20 when the jack 10 is angularly extended beneath the frame 12 prior to the jack 10 being pulled to the vertically extending position. The engagement between the ground 20 and the ground engaging portions 70 of the stop flanges 64 and 66 thus limits the movement of the jack 10 in the jacking direction 88 positioning the jack 10 in a predetermined jacking position, as shown in FIG. 5. By stopping the movement of the jacking 10 in the jacking direction 88 at the predetermined jacking position prior to the jack 10 being pulled to the vertically extending position, the jack 10 is prevented from being pulled in the jacking direction 88 beyond the vertically extending position and further toward the front end 16 of the frame 12 which would, of course, result in pulling the jack 10 out of engagement with the frame 12.

In the jacking position of the jack 10, the frame 12 is elevated a distance above the ground 20 determined by the height of the jack 10 between the upper and the lower ends 36 and 38 of the jack body 34 or, more particularly, between the upper end 50 of the member 48 and the wheel 84, considering the angular position of the jack 10. In other words, the frame 12 is elevated a distance above the ground 20 corresponding to the effective vertical height of the jack 10 in a jacking position thereof. The height of the jack 10 is adjustable via repositioning the pin 56 in different openings 54, as mentioned before, thereby providing an adjustable elevation effected via the jack 10.

The winch 22 is secured to maintain the cable 24 taut between the winch 22 and the jack 10, the winch 22 and cable 24 cooperating with the stop flanges 64 and 66 to secure the jack 10 in a jacking position beneath the frame 12. When it is desired to release the jack 10 from the jacking position such as after a flat wheel has been changed, for example, the handle 28 is rotated in a direction releasing the cable 24 and allowing the jack 10 to roll in a direction, opposite the jacking direction 88, thereby rolling the jack 10 from beneath the frame 12 and disengaging the jack from the jacking position. The angularly extending position of the jack 10 in the jacking position thereof facilitates the movement of the jack 10 in the direction opposite the jacking direction 88 when the winch 22 is rotated in a direction releasing the cable 24.

Embodiment of FIG. 6

Shown in FIG. 6 is a portion of a modified jack 10a constructed similar to the jack 10, described in detail before. The base 40a and the member 48a of the jack body 34a have a square shaped cross-section in lieu of the cylindrically shaped base 40 and member 48 of the jack 10.

A plate 100 having a plate base 102 portion and an angle portion 104 extending a distance angularly from the plate base 102 is hingedly connected to the upper end 50a of the member 48a via a hinge rod 106 journally extending through the upper end 50a. The plate base 102 is secured to the hinge rod 106 and the plate base 102 is pivotally movable in pivot directions 108 and 110, the movement of plate base 102 in the direction 110 being limited via the engagement between the plate base 102 and the upper end 50a of the member 48a.

Thus, in the operation of the jack 10a, the jack 10a is positioned beneath the frame 12 and the angle portion 104 and the plate base 102 are positioned in engagement with a portion of the frame 12 such as the cross-member 62. In this initial position, the plate 100 is pivoted in a pivot direction 108 lifting the plate base 102 a distance above and from engagement with the upper end 50a of the member 48a due to the initial inclined or angularly extending position of the jack 10a beneath the frame 12 and the engagement between the frame 12 and the plate 100. As the jack 10a is pulled to the jacking position via the winch 22 and the cable 24 in a manner described before, the plate 100 is pivoted in the direction 110 to a position wherein the plate base 102 engages the upper end 50a of the member 48a. In some applications, the hingedly mounted plate 100 provides a more positive engagement between the frame 12 and the jack 10a as the jack 10a is positioned in the jacking position and removed therefrom.

Changes may be made in the construction and the operation of the various components described herein without departing from the spirit and the scope of the invention as defined in the following claims.

What is claimed is:

1. A jack for elevating a frame a distance above the ground, comprising:

a jack body having an upper end engageable with a portion of the frame in a jacking position and a lower end;

a wheel rollingly secured to the lower end of the jack body;

means, having a portion attachable to a portion of the jack body, for pulling the jack body in a jacking direction generally toward a vertical position beneath the frame, the jack body being rollingly supported via the wheel and elevating the frame while being pulled in a jacking direction in an engaging position of the upper end of the jack body and a portion of the frame, the frame being elevated via a distance generally corresponding to the height of the jack between the upper end of the jack body and the wheel and the angular position of the jack body in a jacking position thereof; and means, having a portion secured to the jack body, limiting the movement of the jack body in a jacking direction and positioning the jack body in a predetermined jacking position beneath the frame, said means including a stop flange secured to the jack body and having a ground engaging portion engageable with the ground in a jacking position of the jack body, the stop flange engaging the ground and limiting the movement of the jack body in a jacking direction positioning the jack body in a jacking position beneath the frame.

2. The apparatus of claim 1 wherein the means limiting the movement of the jack body in a jacking direction is defined further as positioning the jack body in a jacking position extending at an angle limiting further movement of the jack body in a jacking direction prior to the jack body moving to a vertically extending position.

3. The apparatus of claim 1 wherein the jack body is defined further to include:

a base, having an upper end, a lower end and an opening extending a distance therethrough intersecting the upper end thereof, the lower end forming a portion of the lower end of the jack body;

a member, having an upper end forming a portion of the upper end of the jack body and a lower end telescopingly disposed in the opening in the base; and means engaging a portion of the base and a portion of the member limiting the movement of the member within the opening of the base in a direction generally toward the lower end of the base and positioning the member in predetermined positions in the base.

4. The apparatus of claim 1 wherein the means for pulling the jack body is defined further to include:

a pull bar, having opposite ends, one end pivotally attached to the jack body and the opposite end extending a distance from the jack body; and winch means having a cable retrievably and releasably secured thereto, one end of the cable being removably connectable to the end of the pull bar, opposite the end of the pull bar pivotally connected to the jack body, the winch means pulling the jack body in a jacking direction via the cable in a cable retrieving position.

5. The apparatus of claim 1 defined further to include:

a plate, having a plate base portion and an angle portion;

a hinge connected to the upper end of the jack body and to the plate hingedly securing the plate to the jack body, the plate, generally near the angle portion thereof, being removably engageable with a portion of the frame, the plate base movable to a position engaging the upper end of the jack body limiting the movement of the plate in one direction securing the engagement between the plate and the frame in a jacking position.

6. A jack for elevating a frame a distance above the ground, comprising:

a jack body having an upper end engageable with a portion of the frame in a jacking position and a lower end;

a wheel rollingly secured to the lower end of the jack body;

means, having a portion attachable to a portion of the jack body, for pulling the jack body in a jacking direction generally toward a vertical position beneath the frame, the jack body being rollingly supported via the wheel and elevating the frame while being pulled in a jacking direction in an engaging position of the upper end of the jack body and a portion of the frame, the frame being elevated via a distance generally corresponding to the height of the jack between the upper end of the jack body and the wheel and the angular position of the jack body in a jacking position thereof; and a pair of stop flanges, each stop flange secured to one side of the jack body and being spaced a distance apart, each stop flange having a ground engaging portion engageable with the ground in a jacking position of the jacking body, the pair of stop flanges engaging the ground and limiting the movement of the jack body in a jacking direction positioning the jack body in a jacking position beneath the frame, the wheel being rollingly supported between the pair of stop flanges.

* * * * *

PO-1050
(5/69)

UNITED STATES PATENT OFFICE
CERTIFICATE OF CORRECTION

Patent No. 3,881,691            Dated May 6, 1975

Inventor(s) Eugene D. Colclasure

It is certified that error appears in the above-identified patent and that said Letters Patent are hereby corrected as shown below:

Column 1, line 25, "outer" should be --other--.

Column 1, line 34, "ojbect" should be --object--.

Column 8, line 13, "jacking body" should be --jack body--.

Signed and Sealed this twenty-second Day of July 1975

[SEAL]

Attest:

RUTH C. MASON
Attesting Officer

C. MARSHALL DANN
Commissioner of Patents and Trademarks